US012579106B2

(12) United States Patent
Yeom et al.

(10) Patent No.: US 12,579,106 B2
(45) Date of Patent: Mar. 17, 2026

(54) METHOD FOR PERFORMING INTEGRITY CHECK, AND ELECTRONIC DEVICE USING SAME

(71) Applicant: SAMSUNG ELECTRONICS CO., LTD., Suwon-si (KR)

(72) Inventors: Junbeom Yeom, Suwon-si (KR);
Yeongjin Gil, Suwon-si (KR);
Sungjong Seo, Suwon-si (KR);
Woojoong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 29 days.

(21) Appl. No.: 18/203,441

(22) Filed: May 30, 2023

(65) Prior Publication Data

US 2023/0305999 A1 Sep. 28, 2023

Related U.S. Application Data

(63) Continuation of application No. PCT/KR2021/012301, filed on Sep. 9, 2021.

(30) Foreign Application Priority Data

Dec. 1, 2020 (KR) ........................ 10-2020-0165992

(51) Int. Cl.
*G06F 16/17* (2019.01)
*G06F 12/02* (2006.01)
(Continued)

(52) U.S. Cl.
CPC ...... *G06F 16/1734* (2019.01); *G06F 12/0253* (2013.01); *G06F 16/13* (2019.01);
(Continued)

(58) Field of Classification Search
CPC .... G06F 16/1734; G06F 16/148; G06F 16/13; G06F 16/172; G06F 12/0253; G06F 2212/702
See application file for complete search history.

(56) References Cited

U.S. PATENT DOCUMENTS 7,680,837 B2 3/2010 Yamato
8,103,639 B1 * 1/2012 Srinivasan ............ G06F 16/134
707/690

(Continued)

FOREIGN PATENT DOCUMENTS

JP 2009-503738 A 1/2009
JP 2016-118860 A 6/2016
(Continued)

OTHER PUBLICATIONS

International Search Report (PCT/ISA/210) issued by the International Searching Authority on Dec. 22, 2021 in International Patent Application No. PCT/KR2021/012301.
(Continued)

*Primary Examiner* — Jensen Hu
(74) *Attorney, Agent, or Firm* — Sughrue Mion, PLLC

(57) ABSTRACT

An electronic device includes: an auxiliary storage device configured to manage a file stored in a log-structured file system; a main storage device; and a processor operatively connected to the auxiliary storage device and the main storage device. The processor is configured to: inspect metadata of the auxiliary storage device; identify a location of a node of the file in the metadata; read information of the node of the file in the identified location of the node of the file; arrange the node of the file, based on the information of the node of the file; read information of the arranged node of the file; store the information of the arranged node of the file in the main storage device; and inspect the stored (Continued)

information of the arranged node of the file in the main storage device.

10 Claims, 14 Drawing Sheets

(51) Int. Cl.
| | |
|---|---|
| *G06F 16/13* | (2019.01) |
| *G06F 16/14* | (2019.01) |
| *G06F 16/172* | (2019.01) |

(52) U.S. Cl.
CPC .......... *G06F 16/148* (2019.01); *G06F 16/172* (2019.01); *G06F 2212/702* (2013.01)

(56) References Cited

U.S. PATENT DOCUMENTS

| | | | | |
|---|---|---|---|---|
| 8,285,758 | B1* | 10/2012 | Bono | .................... G06F 16/119 |
| | | | | 707/822 |
| 10,235,285 | B1 | 3/2019 | Wallace | |
| 10,515,009 | B1 | 12/2019 | Wallace | |
| 2006/0184720 | A1 | 8/2006 | Sinclair et al. | |
| 2007/0030734 | A1 | 2/2007 | Sinclair et al. | |
| 2008/0235467 | A1 | 9/2008 | Tagawa | |
| 2012/0243170 | A1 | 9/2012 | Frink et al. | |
| 2012/0290870 | A1 | 11/2012 | Shah et al. | |
| 2013/0318126 | A1* | 11/2013 | Graefe | ................ G06F 16/2246 |
| | | | | 707/E17.012 |
| 2014/0279943 | A1 | 9/2014 | Shiozawa | |
| 2015/0254013 | A1 | 9/2015 | Chun | |
| 2016/0179423 | A1 | 6/2016 | Mizuno et al. | |
| 2017/0177653 | A1 | 6/2017 | Goda et al. | |
| 2018/0011764 | A1 | 1/2018 | Akutsu et al. | |
| 2018/0293165 | A1 | 10/2018 | Zik et al. | |
| 2020/0301884 | A1 | 9/2020 | Eom | |
| 2020/0326863 | A1 | 10/2020 | Karr et al. | |
| 2021/0026807 | A1 | 1/2021 | Jeong et al. | |
| 2021/0034520 | A1* | 2/2021 | Davenport | .......... G06F 12/0804 |
| 2021/0042267 | A1* | 2/2021 | Thompson | .......... G06F 16/1748 |
| 2022/0083530 | A1* | 3/2022 | Pancha | ................. G06F 9/5027 |

FOREIGN PATENT DOCUMENTS

| | | | |
|---|---|---|---|
| JP | 6712744 | B2 | 6/2020 |
| JP | 2020-144913 | A | 9/2020 |
| KR | 10-2008-0086828 | A | 9/2008 |
| KR | 10-2016-0058198 | A | 5/2016 |
| KR | 10-2017-0016034 | A | 2/2017 |
| KR | 10-2017-0092712 | A | 8/2017 |
| KR | 10-2019-0098516 | A | 8/2019 |
| KR | 10-2033323 | B1 | 10/2019 |
| KR | 10-2088435 | B1 | 3/2020 |
| KR | 10-2020-0111989 | A | 10/2020 |
| WO | 2018/231350 | A1 | 12/2018 |

OTHER PUBLICATIONS

Written Opinion (PCT/ISA/237) issued by the International Searching Authority on Dec. 22, 2021 in International Patent Application No. PCT/KR2021/012301.
Communication issued on Jan. 15, 2026 by the Korean Ministry of Intellectual Property (MOIP) in Korean Patent Application No. 10-2020-0165992.

* cited by examiner

FIG. 4

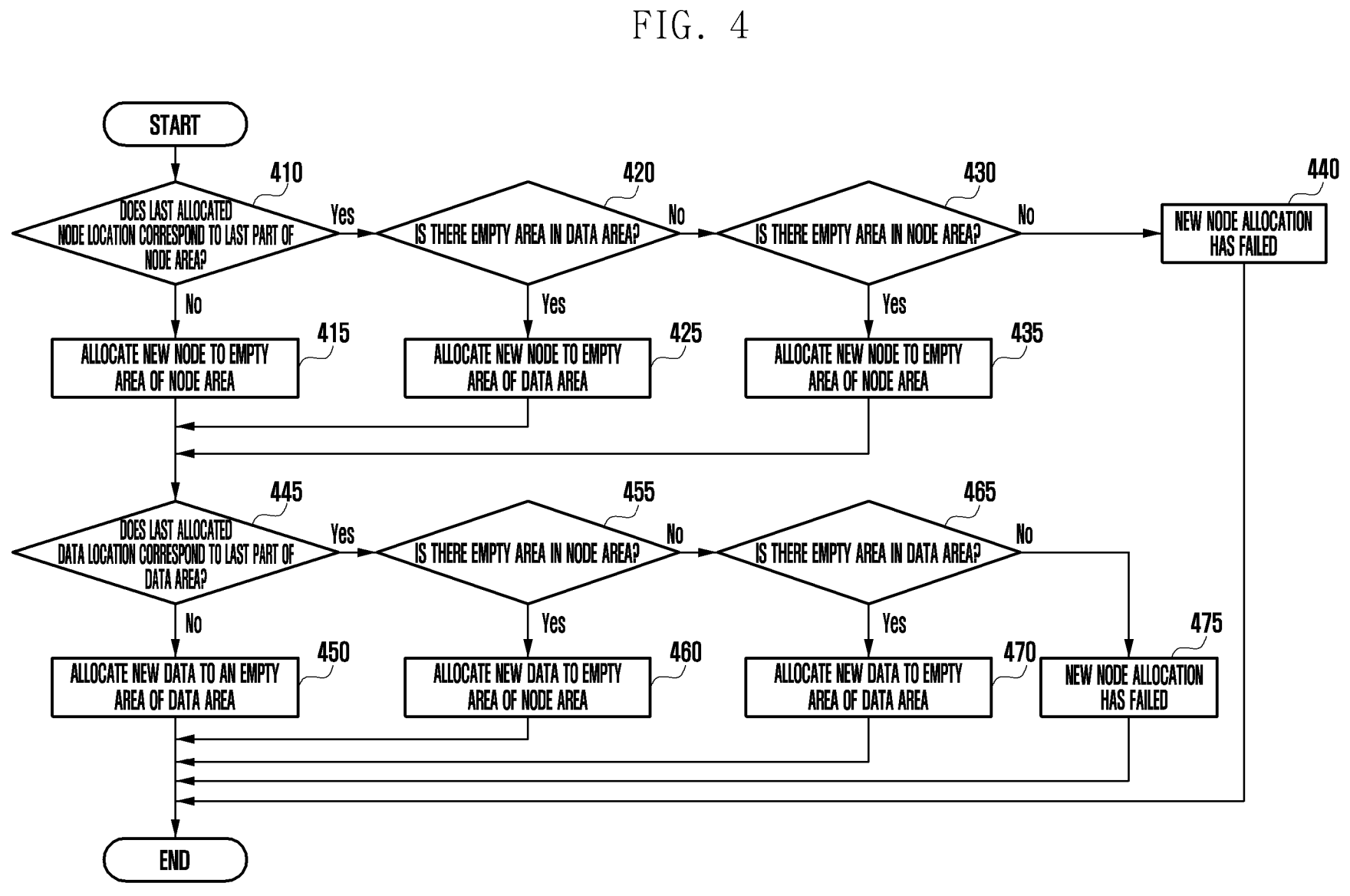

START

410 — DOES LAST ALLOCATED NODE LOCATION CORRESPOND TO LAST PART OF NODE AREA?

Yes → 420 — IS THERE EMPTY AREA IN DATA AREA?
No → 430 — IS THERE EMPTY AREA IN NODE AREA?

No (from 410) → 415 — ALLOCATE NEW NODE TO EMPTY AREA OF NODE AREA

420 Yes → 425 — ALLOCATE NEW NODE TO EMPTY AREA OF DATA AREA
420 No → 430

430 Yes → 435 — ALLOCATE NEW NODE TO EMPTY AREA OF NODE AREA
430 No → 440 — NEW NODE ALLOCATION HAS FAILED

445 — DOES LAST ALLOCATED DATA LOCATION CORRESPOND TO LAST PART OF DATA AREA?

Yes → 455 — IS THERE EMPTY AREA IN NODE AREA?
No → 465 — IS THERE EMPTY AREA IN DATA AREA?

No (from 445) → 450 — ALLOCATE NEW DATA TO AN EMPTY AREA OF DATA AREA

455 Yes → 460 — ALLOCATE NEW DATA TO EMPTY AREA OF NODE AREA
455 No → 465

465 Yes → 470 — ALLOCATE NEW DATA TO EMPTY AREA OF DATA AREA
465 No → 475 — NEW NODE ALLOCATION HAS FAILED

END

NODE AREA (310)

DATA AREA (320)

810

820

830

840

EMPTY AREA

AREA IN WHICH DATA IS STORED

AREA IN WHICH NODE IS STORED

1

METHOD FOR PERFORMING INTEGRITY CHECK, AND ELECTRONIC DEVICE USING SAME

CROSS-REFERENCE TO RELATED APPLICATIONS

This application is a by-pass continuation application of International Application No. PCT/KR2021/012301, filed on Sep. 9, 2021, which is based on and claims priority to Korean Patent Application No. 10-2020-0165992, filed on Dec. 1, 2020, in the Korean Intellectual Property Office, the disclosures of which are incorporated by reference herein their entireties.

BACKGROUND

1. Field

The disclosure relates to a method for performing a consistency check (integrity check) in a log-structured file system, and an electronic device using the same method.

2. Description of Related Art

A system in which an operating system manages an auxiliary storage device and files stored therein is collectively referred to as a file system. As the operating system diversifies and the capacity of a storage device increases, types of file systems are also diversified.

In case that the file system has to search for an entire area to inspect errors, performance may be excessively degraded. In a mobile electronic device, as a storage device becomes large and the number of files to be inspected increases, it may take a long time to perform a consistency check, for example, because random reads are performed instead of sequential reads when a file is read for the consistency check. In case that the consistency check takes a long time, a user may perceive that the system has stopped working.

SUMMARY

One or more embodiments of the disclosure are to provide a method for reducing a time required to perform a consistency check in a log-structured file system.

According to an aspect of the disclosure, an electronic device includes: an auxiliary storage device configured to manage a file stored in a log-structured file system; a main storage device; and a processor operatively connected to the auxiliary storage device and the main storage device. The processor is configured to: inspect metadata of the auxiliary storage device; identify a location of a node of the file in the metadata; read information of the node of the file in the identified location of the node of the file; arrange the node of the file, based on the information of the node of the file; read information of the arranged node of the file; store the information of the arranged node of the file in the main storage device; and inspect the stored information of the arranged node of the file in the main storage device.

According to another aspect of the disclosure, an electronic device includes: an auxiliary storage device configured to manage a file stored in a log-structured file system and to store a directory; and a processor operatively connected to the auxiliary storage device. The processor is configured to: select a garbage collection area in the auxiliary storage device, the garbage collection area comprising a node of the file; determine a structure of the directory; select a garbage collection area in the auxiliary storage device; and move the node of the file to a first area, the first area being not selected as the garbage collection area.

According to another aspect of the disclosure, a method for inspecting a consistency of a log-structured file system in an electronic device, includes: inspecting metadata of an auxiliary storage device; identifying a location of a node of a file in the metadata; reading information of the node of the file based on the location of the node of the file; arranging the node of the file based on the information of the node of the file; storing information of the arranged node of the file in a main storage device; and inspecting the node information stored in the main storage device.

According to one or more embodiments of the disclosure, it may be possible to reduce a time taken to perform a consistency check for inspecting errors in the log-structured file system.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates an operation of adding a new file by a modified log-structured file system;

DETAILED DESCRIPTION

Figure 1:
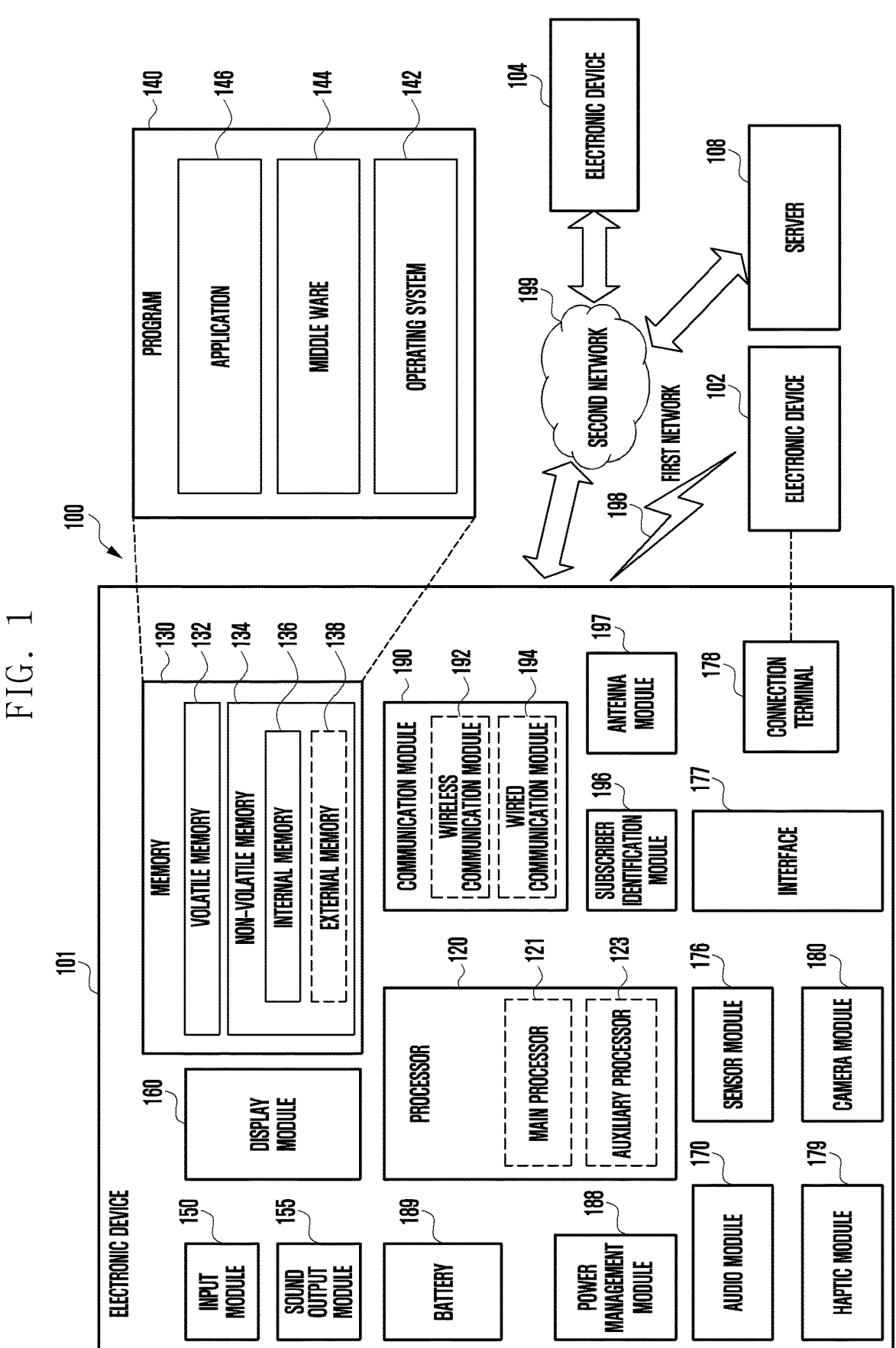
FIG. 1 illustrates a block diagram of an electronic device in network environment according to one or more embodiments.

FIG. 1 is a block diagram illustrating an electronic device 101 in a network environment 100 according to one or more embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server

108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a SIM 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to one or more embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

According to one or more embodiments, a file system may manage files stored in an auxiliary storage device (e.g., the nonvolatile memory 134 of FIG. 1). The file system may improve the efficiency of input/output (I/O) by transmitting data in block units. A block may be configured by one or more sectors, and the size of a sector may range from 32 bytes (B) to 4 KB. The file system may provide an efficient and convenient access to the auxiliary storage device. Types of file systems may include file allocation table (FAT), FAT32, ext2, flash-friendly file system (F2FS), apple file system (APFS), and log-structured file system (in short, LFS).

Figure 2:
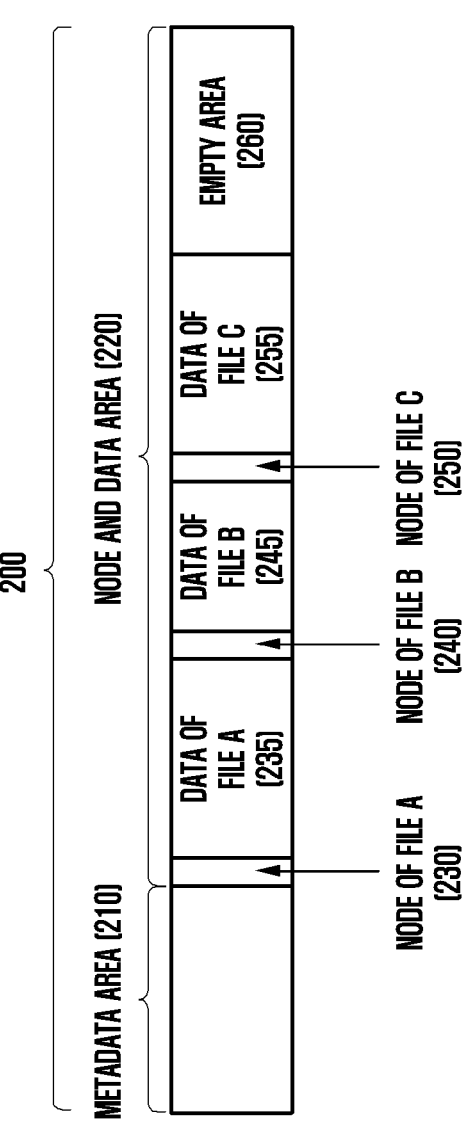
FIG. 2 illustrates a structural diagram of a log-structured file system.

FIG. 2 shows a structural diagram of a log-structured file system.

According to one or more embodiments, the log-structured file system 200 may store each update to a file system as a transaction. When the file system is modified, the corresponding transaction may be deleted from a log.

Referring to FIG. 2, the log-structured file system 200 may include a metadata area 210 and a node and data area 220.

According to one or more embodiments, management data of the file system may be stored in the metadata area 210. For example, information such as a label, an identifier, and a version may be stored in the metadata area 210. The size and location of the metadata area 210 may be determined in proportion to the size of an auxiliary storage device when the file system is formatted.

According to one or more embodiments, a file may be stored in the node and data area 220. A file may include a node and data. The node may include information about a file (e.g., ownership rights, size, data block information of a file), and data may include a content. In the log-structured file system 200, the node may be stored together with data in the node and data area 220 without storing the node in a separate area although the node is metadata.

According to one or more embodiments, FIG. 2 shows an example in which three files (file A, file B, and file C) are stored in the log-structured file system 200. A node 230 of file A, data 235 of file A, a node 240 of file B, data 245 of file B, a node 250 of file C, data 255 of file C may be sequentially stored in the node and data area 220. In the node and data area 220, an area excluding areas in which files A, B, and C are stored may be an empty area 260 in which no files are stored.

Figure 3A:
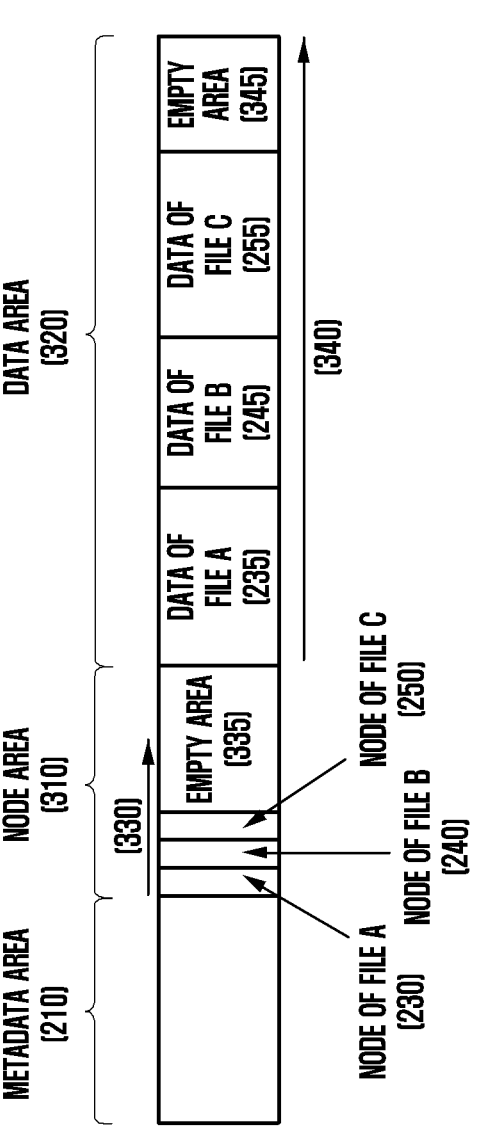
FIG. 3A illustrates a structural diagram of a modified log-structured file system.

FIG. 3A is a structural diagram of a modified log-structured file system.

According to one or more embodiments, the log-structured file system may separately store a node and data of a file in order to efficiently store the node and data. Referring to FIG. 3A, the log-structured file system may divide the node and data area 220 of FIG. 2 into a node area 310 and a data area 320. The nodes of the file may be sequentially stored in the node area 310 in a predetermined direction 330, and the data of the file may be sequentially stored in the data area 320 in a predetermined direction 340. In the node area 310, a first area in which a node of a file is not stored may correspond to an empty area 335. In the data area 320, a second area in which data of a file is not stored may also correspond to an empty area 345.

According to one or more embodiments, even in the modified log-structured file system, in case that the capacity of the auxiliary storage device is small or there are many stored files, data may be stored in the node area 310 and nodes may be stored in the data area 320. This will be described in detail with reference to FIG. 3B.

Figure 3B:
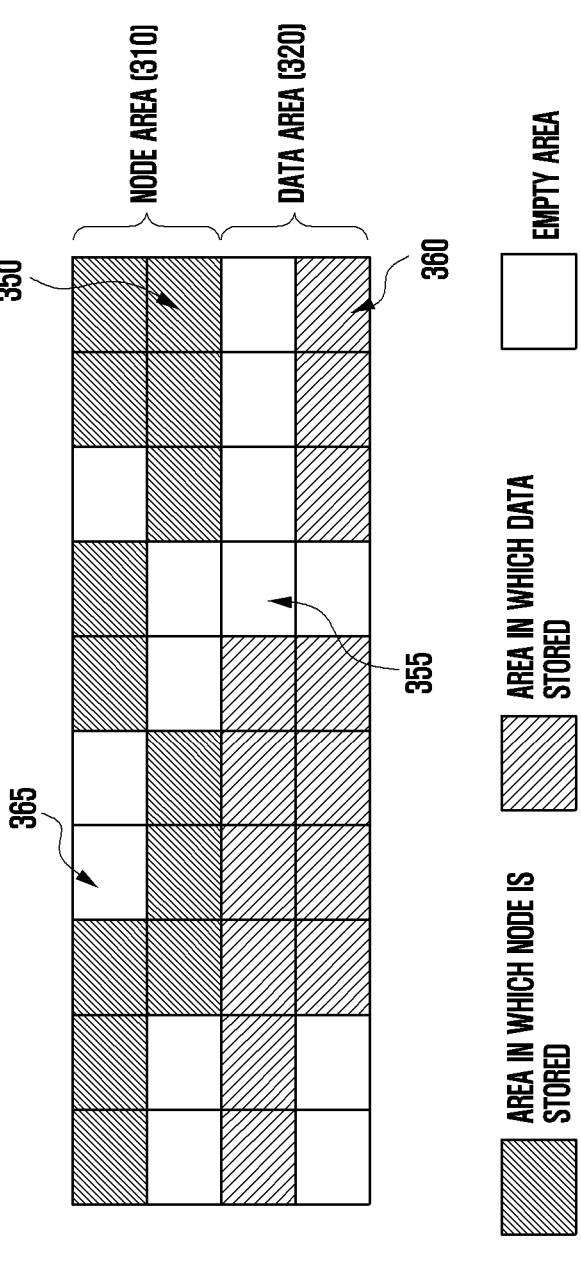
FIG. 3B illustrates an example in which a modified log-structured file system stores a file.

FIG. 3B shows an example in which a modified log-structured file system stores a file.

According to one or more embodiments, as files are added and deleted, a node may be stored in a part of the node area 310, but the other part may correspond to an empty area in which a node is not stored. Data may be stored in a part of the data area 320, and the other part may correspond to an empty area in which data is not stored.

According to one or more embodiments, the log-structured file system may store the location in which a node and data of the last file are stored. Referring to FIG. 3B, the last stored location of the node of the file (e.g., a logical block number of a node managed in a file system) may correspond to a last part 350 of the node area 310. Thereafter, when a new file is stored, the node of the file may be stored in an empty area 355 searched for in a node generation direction (e.g., the reference numeral 330 in FIG. 3A). As the same method, the last stored location of the data of the file may correspond to a last part 360 of the data area 320. Thereafter, when a new file is stored, the data of the file may be stored in an empty area in a data generation direction (e.g., the reference numeral 340 of FIG. 3A). When there is no empty area in the data generation direction (e.g., the reference numeral 340 of FIG. 3A), data of a new file may be stored in an empty area 365 searched for in the node area 310.

According to one or more embodiments, in case that the addition and deletion of files are repeated, data may be stored in the node area 310 and nodes may be stored in the data area 320, and thus nodes and data can be stored without need to divide areas.

FIG. 4 is a flowchart illustrating adding a new file by a modified log-structured file system.

Referring to FIG. 4, the log-structured file system may determine, in order to add a new file, whether the last allocated node location corresponds to the last part of a node area (e.g., the node area 310 of FIG. 3A) in operation 410.

The term "determine" used in one or more embodiments of this document may be used interchangeably with a term such as "decide". For example, in order to add a new file, the log-structured file system may decide (determine) whether the last allocated node location corresponds to the last part of the node area (e.g., the node area 310 of FIG. 3A) in operation 410.

According to one or more embodiments, in operation 415, when the last allocated node location does not correspond to the last part of the node area, the log-structured file system may allocate (or store) a node of a new file to be added to an empty area of the node area 310. The log-structured file system may search for an empty area of the node area 310 in a node generation direction (e.g., reference numeral 330 in FIG. 3A).

According to one or more embodiments, in operation 420, the log-structured file system may determine whether there is an empty area in a data area (e.g., the data area 320 of FIG. 3A) when the last allocated node location corresponds to the last part of the node area. The log-structured file system may determine whether there is an empty area from the beginning part of the data area 320.

According to one or more embodiments, in operation 425, in case that there is an empty area in the data area 320, the log-structured file system may allocate a node of a new file to be added to the empty area of the data area 320.

According to one or more embodiments, in operation 430, in case that there is no empty area in the data area 320, the log-structured file system may determine whether there is an empty area from the beginning part of the node area 310. According to one or more embodiments, since the node generation direction 330 is one direction rather than both directions, the empty area may correspond to the node area 310 that is not searched for in operation 415. The log-structured file system may determine whether there is an empty area from the beginning of the node area 310.

According to one or more embodiments, in operation 435, in case that there is an empty area in the node area 310, the log-structured file system may allocate a node of a new file to be added to the empty area of the node area 310.

According to one or more embodiments, the log-structured file system may not be able to allocate a node of a new file to be added in case that there is no empty area in the node area 310, in operation 440. There may be no empty areas in the node area 310 and the data area 320.

According to one or more embodiments, in operation 445, the log-structured file system may determine whether the last allocated data location corresponds to the last part of the data area 320 in order to store data of a new file.

According to one or more embodiments, in operation 450, the log-structured file system may allocate (or store) data of a new file to be added in an empty area of the data area 320 when the last allocated data location does not correspond to the last part of the data area. The log-structured file system may search for an empty area of the data area 320 in a data generation direction (e.g., reference numeral 340 of FIG. 3A).

According to one or more embodiments, in operation 455, in case that the last allocated data location corresponds to the last part of the data area, the log-structured file system may determine whether there is an empty area in the node area 310. The log-structured file system may determine whether there is an empty area from the beginning part of the node area 310.

According to one or more embodiments, in operation 460, in case that there is an empty area in the node area 310, the log-structured file system may allocate data of a new file to be added in the empty area of the node area 310.

According to one or more embodiments, in operation 465, in case that there is no empty area in the node area 310, the log-structured file system may determine whether there is an empty area from the beginning part of the data area 320. According to one or more embodiments, since the data generation direction 340 is one direction rather than both directions, the empty area may correspond to the data area 320 that is not searched for in operation 450. The log-structured file system may determine whether there is an empty area from the beginning of the data area 320.

According to one or more embodiments, in operation 470, in case that there is an empty area in the data area 320, the log-structured file system may allocate data of a new file to be added in the empty area of the data area 320.

According to one or more embodiments, in operation 475, the log-structured file system may not be able to allocate data of a new file to be added in case that there is no empty area in the data area 320. There may be no empty areas in the node area 310 and the data area 320.

According to one or more embodiments, an error may occur in a file system. A file system consistency check (fsck) may correct and recover errors occurring in the file system. The file system consistency check may be executed during bootup. Alternatively, the file system consistency check may be performed at a user's request.

Figure 5:
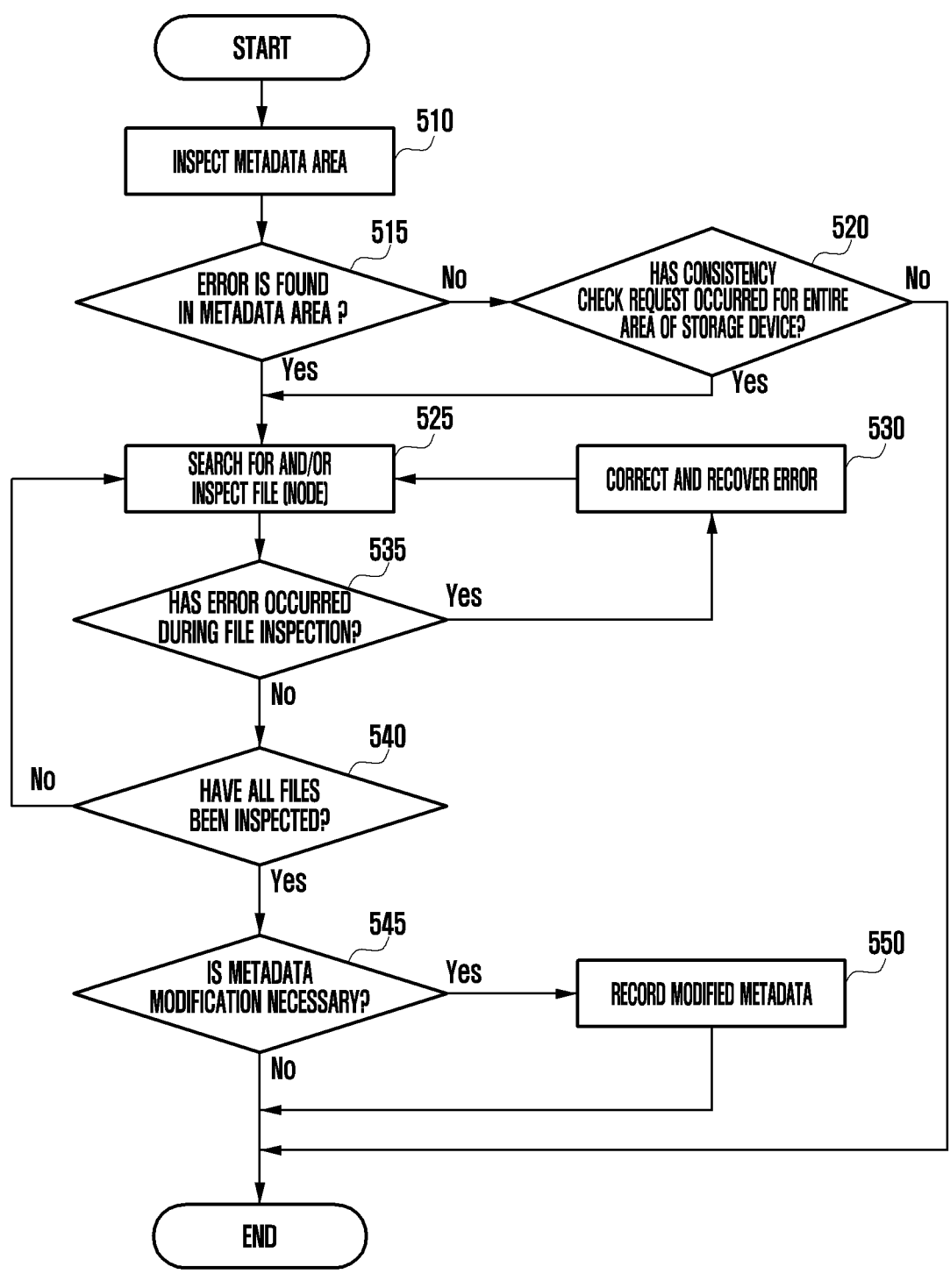
FIG. 5 illustrates an example of a flowchart illustrating a consistency check of a file system.

FIG. 5 illustrates an example of a flowchart illustrating a consistency check of a file system.

According to one or more embodiments, a file system consistency check may inspect a metadata area (e.g., the metadata area 210 of FIG. 2) in operation 510. Since the inspection of the metadata area is performed on a consecutive area at a fixed location, the metadata area inspection may be performed through a sequential read.

According to one or more embodiments, the file system consistency check may determine whether an error is found (or detected) in the metadata area 210 in operation 515.

According to one or more embodiments, in operation 520, in case that an error is not found in the metadata area 210, the file system consistency check may determine whether a consistency check request has occurred for an entire area of the file system.

According to one or more embodiments, in case that there is no consistency check request occurring for the entire area of the file system, the file system consistency check may determine that there is no problem and end the check.

According to one or more embodiments, in operation 525, when it is determined that an error is found in the metadata area 210 or that a consistency check request has occurred for the entire area of the file system, the file system consistency check may search for and/or inspect a file (specifically, a node of a file).

According to one or more embodiments, the file system consistency check may search all files in a depth-first search method starting from the top directory (root) and perform a consistency check on nodes of the file. Since the nodes of the file are scattered across the node and data area of the file system (e.g., the node and data area 220 in FIG. 2), random read/write may be performed in order to inspect a node of a file. A detailed description of the search and/or inspection of a file (a node of a file) will be described in detail with reference to FIG. 6 below.

According to one or more embodiments, the file system consistency check may determine whether an error has occurred in a file (or a node of a file) in operation 535.

According to one or more embodiments, in operation 530, when it is determined that an error has occurred in a file (or a node of a file), the file system consistency check may correct and recover the error.

According to one or more embodiments, in operation 540, when it is determined that no error has occurred in a file (or a node of a file), the file system consistency check may determine whether all files in the file system have been inspected to terminate a consistency check of the file system.

According to one or more embodiments, when it is determined that not all files in the file system have been inspected, the file system consistency check may perform operation from operation 525.

According to one or more embodiments, in operation 545, when it is determined that all files in the file system have been inspected, the file system consistency check may determine whether metadata modification is necessary. The file system consistency check may determine whether the metadata modification is necessary by determining whether an error with respect to the node of the file is related to the metadata.

According to one or more embodiments, the file system consistency check may terminate a consistency check of the file system when it is determined that the metadata does not need to be modified.

According to one or more embodiments, in operation 550, the file system consistency check may record the modified metadata when it is determined that the metadata needs to be modified. The file system consistency check may record the modified metadata and terminate a consistency check of a file system.

Figure 6:
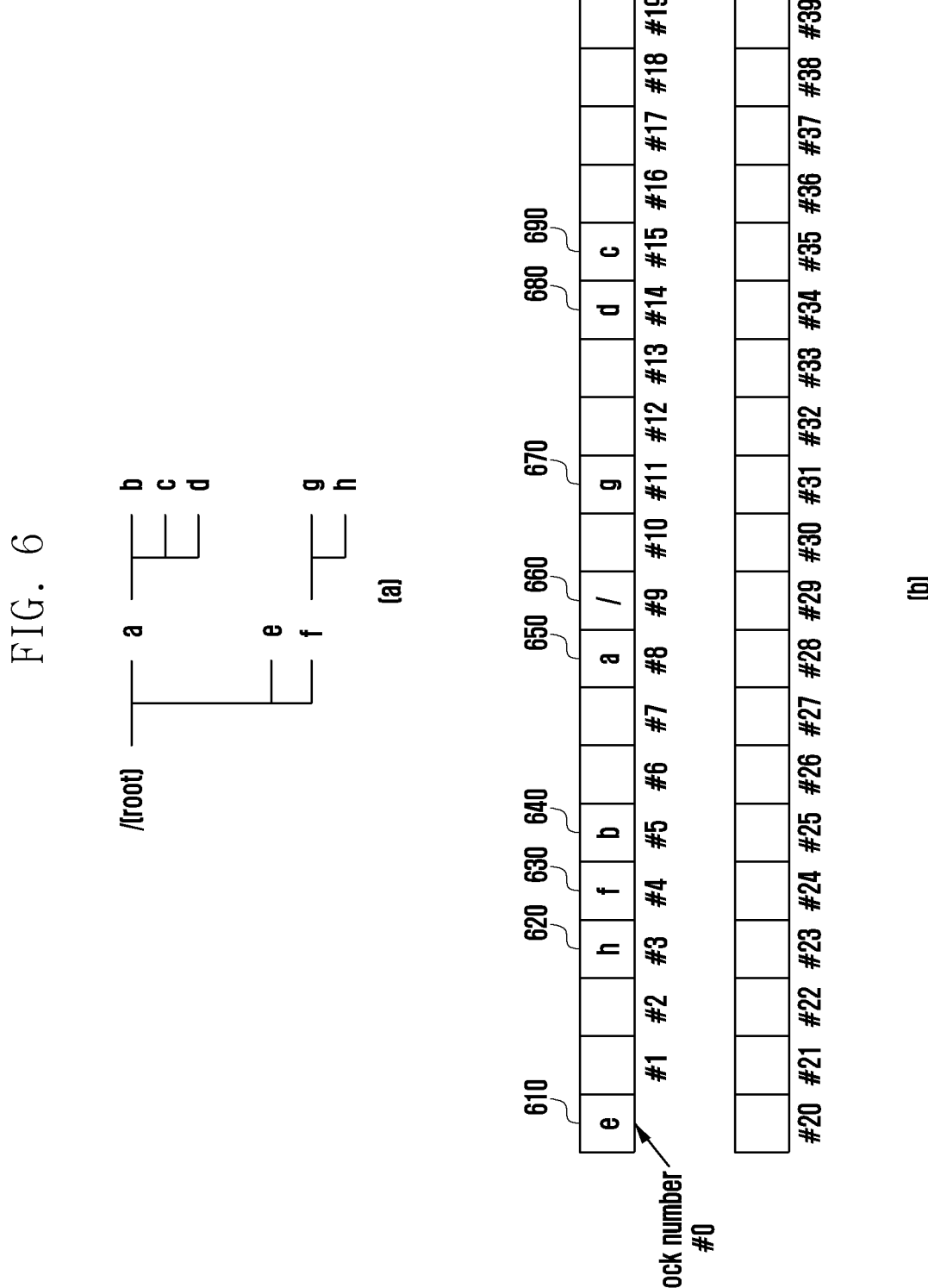
FIG. 6 illustrates an example in which a log-structured file system stores a file.

FIG. 6 illustrates an example in which a log-structured file system stores a file.

According to one or more embodiments, in order to describe the search and/or inspection of a file (a node of a file), (a) of FIG. 6 illustrates an example of a directory and file structure, and (b) of FIG. 6 illustrates an example of a location in which a node of a file is stored.

Referring to (a) of FIG. 6, the log-structured file system may include a total of 9 files. The top-level directory (/) may include three files of a, e, and f. The file a (e.g., directory) may include three files of b, c, and d, and the file f (e.g., directory) may include two files of g and h.

(b) of FIG. 6 illustrates that each node of a file is stored in different blocks for better understanding, but multiple nodes of a file may be stored in one block. Referring to (b) of FIG. 6, the node of the top directory (/) may be stored in block #9 660, and the node of the file a may be stored in block #8 650. The node of file b may be stored in block #5 640, the node of file c may be stored in block #15 690, the node of file d may be stored in block #14 680, and the node of file e may be stored in block #0 610, the node of file f may be stored in block #4 630, the node of file g may be stored in block #11 670, and the node of file h may be stored in block #3 620.

According to one or more embodiments, a depth-first search method relates to a method for searching for data or searching a tree or graph, and is a method of recursively searching for other adjacent nodes starting from one node and then returning to the top again after searching to the end so as to perform the next search. In case that a log-structured file system searches or inspects a file (or a node of a file) in a depth-first search method, the inspection of a file (or a node of a file) may be performed in the order of /→a→b→c→d→e→f→g→h. The order of inspection of a file may be expressed as a block number such as, #9 660→#8 650→#5 640→#15 690→#14 680→#0 610→#4 630→#11 670→#3 620, and thus random read may be performed.

Figure 7A:
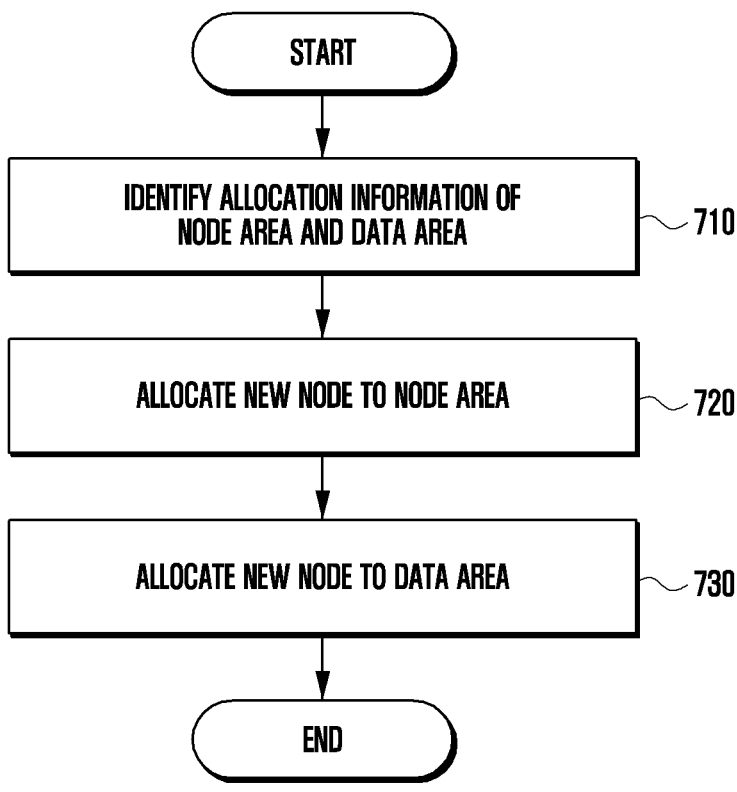
FIG. 7A illustrates an operation of adding a new file by a log-structured file system according to one or more embodiments.

FIG. 7A is a flowchart illustrating adding a new file by a log-structured file system according to one or more embodiments.

Referring to FIG. 7, the log-structured file system may identify allocation information of a node area and a data area in operation 710 to add a new file. The node area and data area may be configured by a system manager. The node area and data area may be configured automatically to allocate a predetermined portion of the entire file system (e.g., the percentage (%) of the total file system, file system capacity). The log-structured file system may identify the last allocated node and data locations.

According to an embodiment, the size of the node area may be smaller than the size of the data area. For example, the size of the node area may be configured as a predetermined ratio (e.g., 1%) of the size of the data area.

According to one or more embodiments, the log-structured file system may allocate a node of a new file to a node area in operation 720. In the log-structured file system, in case that the last allocated node location corresponds to the last part of the node area, the log-structure file system may search the empty area of the node area instead of the empty area of the data area. Since the log-structured file system searches the node area in a predetermined direction to detect the empty area, the area before the last allocated node location may not correspond to the searched area, and thus searching is enabled from the beginning of the node area. A detailed description of a method for adding a new file in the log-structured file system will be described in detail with reference to FIG. 8A below.

According to one or more embodiments, the log-structured file system may allocate data of a new file to a data area in operation 730. In case that the last allocated data location corresponds to the last part of the data area, the log-structured file system may search the empty area of the data area instead of the empty area of the node area. Since the log-structured file system searches the data area in a predetermined direction to detect the empty area, the area before the last allocated data location may not correspond to the searched area, and thus searching is enabled from the beginning of the data area.

Figure 7B:
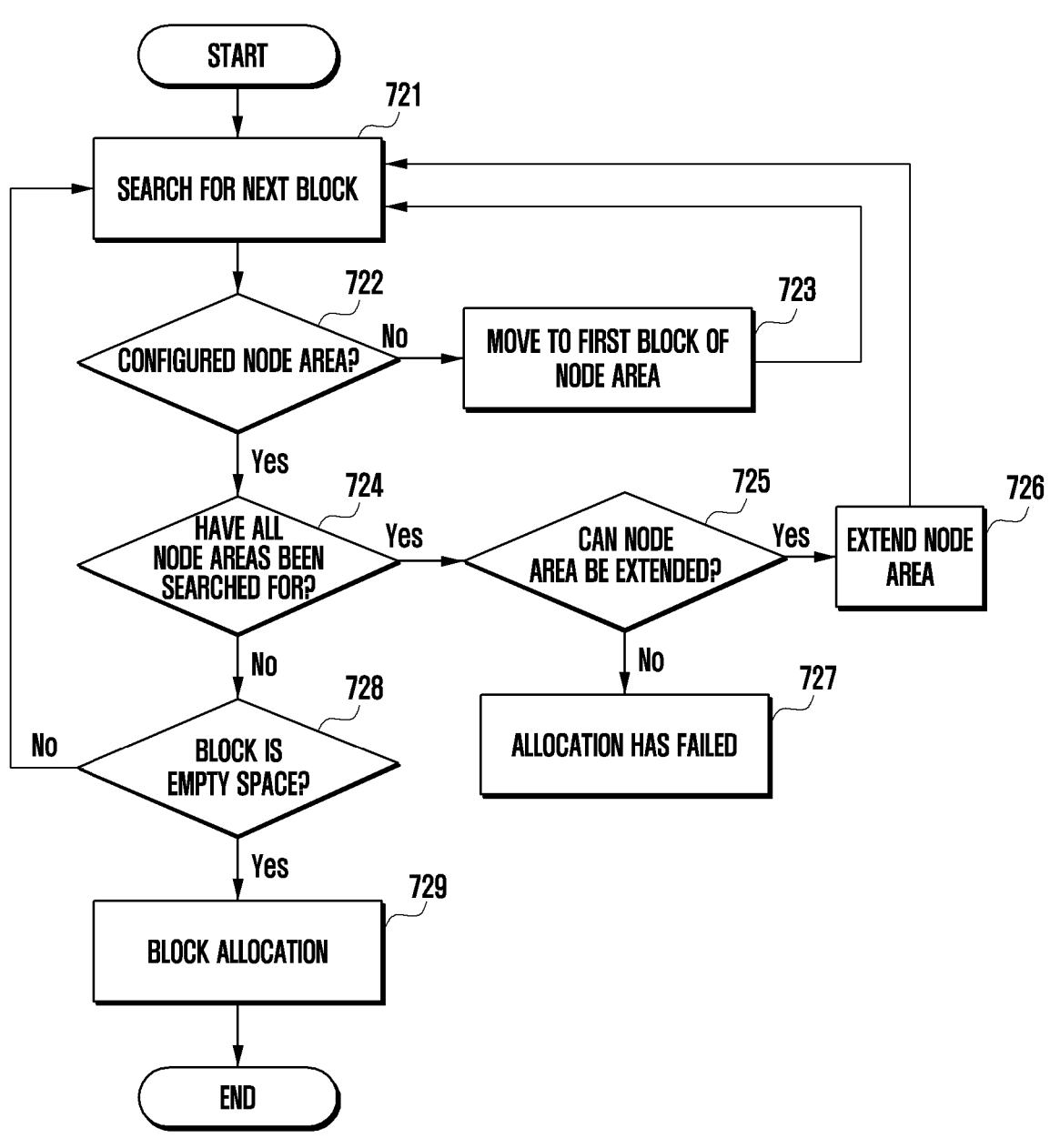
FIG. 7B illustrates an operation of allocating a new node to a node area according to the embodiment of FIG. 7A.

FIG. 7B is a flowchart illustrating allocation of a new node to a node area according to the embodiment of FIG. 7A.

According to an embodiment, operation 720 of FIG. 7A may proceed in the order shown in FIG. 7B. Referring to FIG. 7B, in operation 721, the log-structured file system may search for a next block of a current block to allocate a node of a new file to the node area. The current block may correspond to a block last stored by the log-structured file system.

The log-structured file system may identify whether the next searched block corresponds to a configured node area in operation 722. The log-structured file system may move to the first block of the node area in operation 723 when the next searched block does not correspond to a configured node area.

When the next searched area corresponds to a configured node area, the log-structured file system may identify whether all node areas have been searched for in operation 724. When all the node areas have been identified as being searched, the log-structured file system may identify whether the node area can be extended in operation 725. When it is identified that the node area can be extended, the log-structured file system may extend the node area in operation 726. Further, when it is identified that the node area cannot be extended, the log-structured file system may determine that the node area allocation has failed in operation 727.

In case that it is identified in operation 728 that not all node areas have been searched for, the log-structured file system may identify whether the searched block is an empty space. The log-structured file system may search for a next block in operation 721 in case that the searched block is not an empty space, and may allocate a block in operation 729 in case that the searched block is an empty space.

Figure 8A:
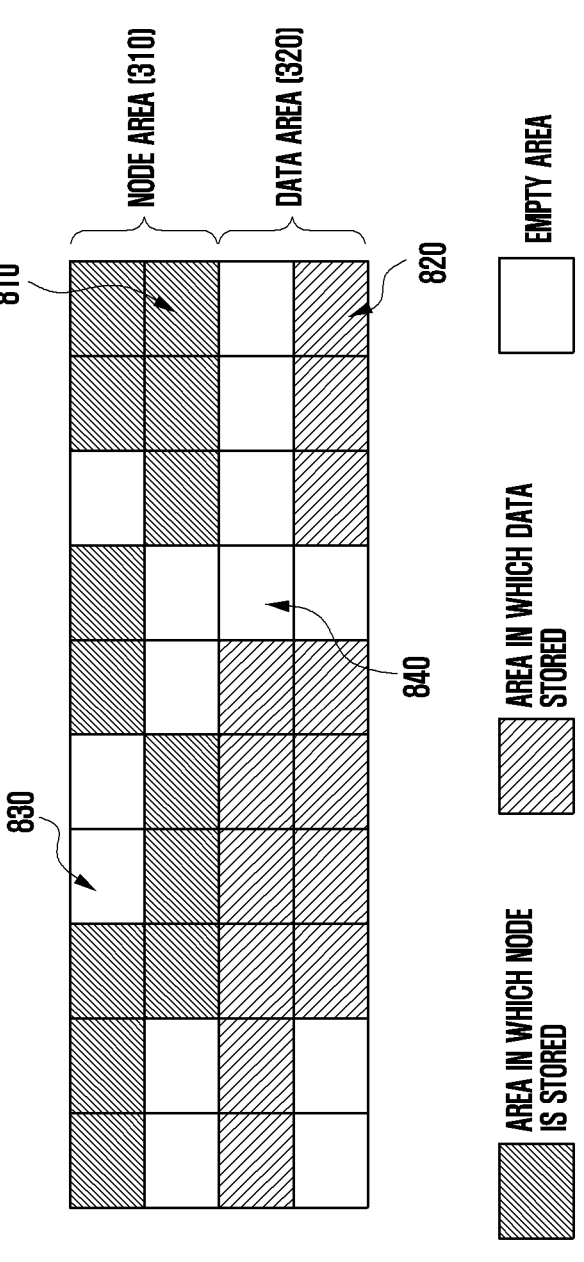
FIG. 8A illustrates an example in which a log-structured file system stores a file according to one or more embodiments.

FIG. 8A illustrates an example in which a log-structured file system stores files according to one or more embodiments.

As in FIG. 3B, as files are added and deleted, a node may be stored in a part of the node area 310, but the other part may be an empty area in which a node is not stored. Data may be stored in a part of the data area 320, and the other part may be an empty area in which data is not stored.

According to one or more embodiments, the log-structured file system may store the location in which a node and data of the last file are stored. Referring to FIG. 8A, the last stored location of the node of the file may correspond to a last part 810 of the node area 310. Thereafter, when a new file is stored, the node of the file may be stored in a blank area 830 detected by searching for from the beginning of the node area 310. In the same method, the location of the last stored data of the file may correspond to a last part 820 of the data area 320. Thereafter, when a new file is stored, the data of the file may be stored in the blank area 840 detected by searching for from the beginning of the data area 320.

Figure 8B:
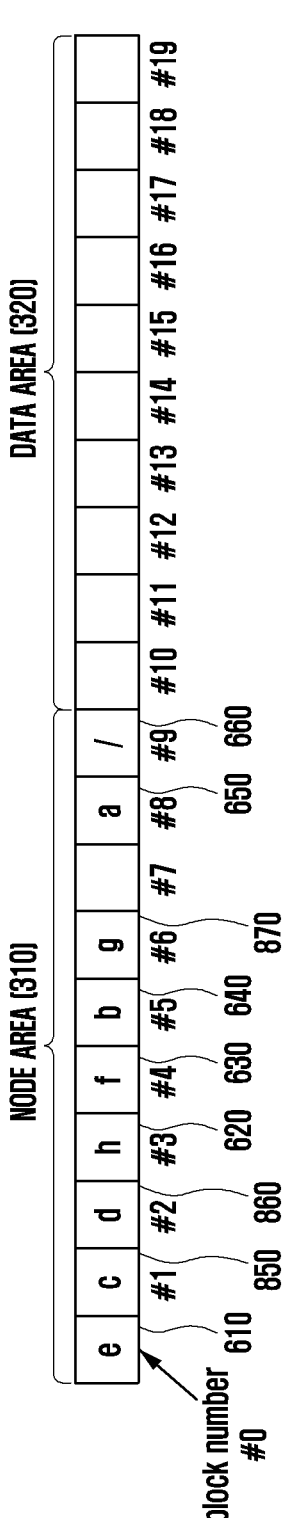
FIG. 8B illustrates an example of a location in which a node of a file is stored according to FIG. 8A.

FIG. 8B illustrates an example of a location in which a node of a file is stored according to FIG. 8A. Referring to FIG. 8B, a node of a file may be stored only in the node area 310, and data of a file may be stored in the data area 320 and the node of the file may not be stored therein. For example, the node area 310 may include blocks #0 to #9, and the data area 320 may include blocks #10 to #19. In node area 310, a node of file e may be stored in block #0 610, a node of file c may be stored in block #1 850, a node of filed d may be stored in block #2 860, a node of file h may be stored in block #3 620, a node of file f may be stored in block #4 630, a node of file b may be stored in block #5 640, a node of file g may be stored in block #6 870, a node of file a may be stored in block #8 650, and a node of the top-level directory (/) may be stored in block #9 660.

According to one or more embodiments, when a node of a file is stored as shown in FIG. 8B, the file system may inspect only the node area and terminate the consistency check.

Figure 9:
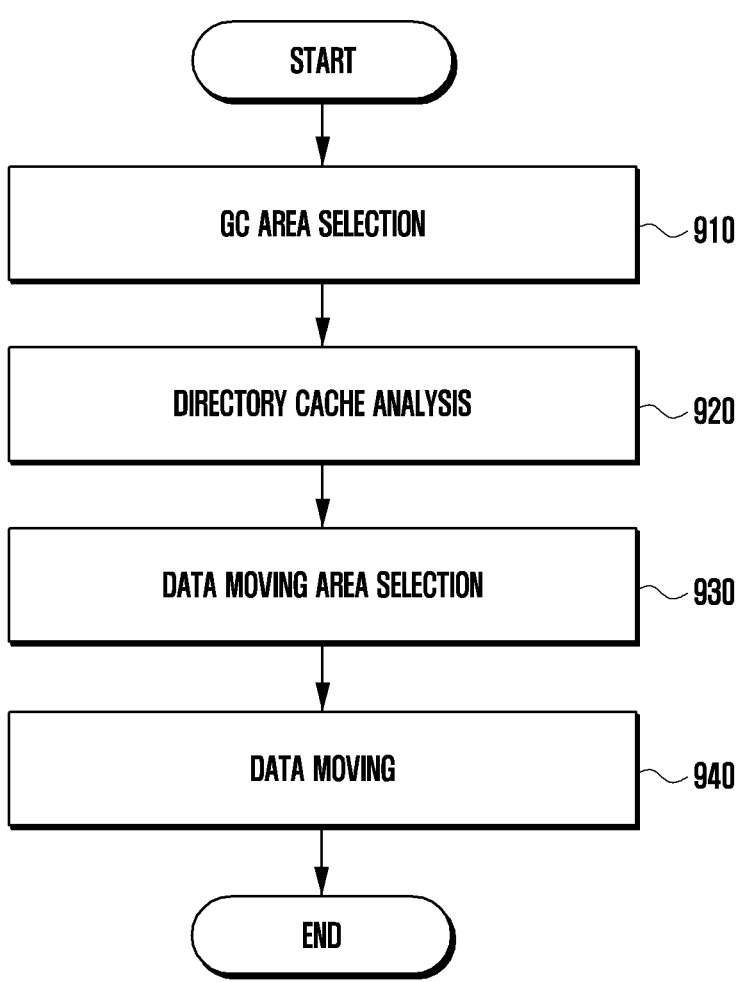
FIG. 9 illustrates a garbage collection (GC) according to one or more embodiments.
Figure 10:
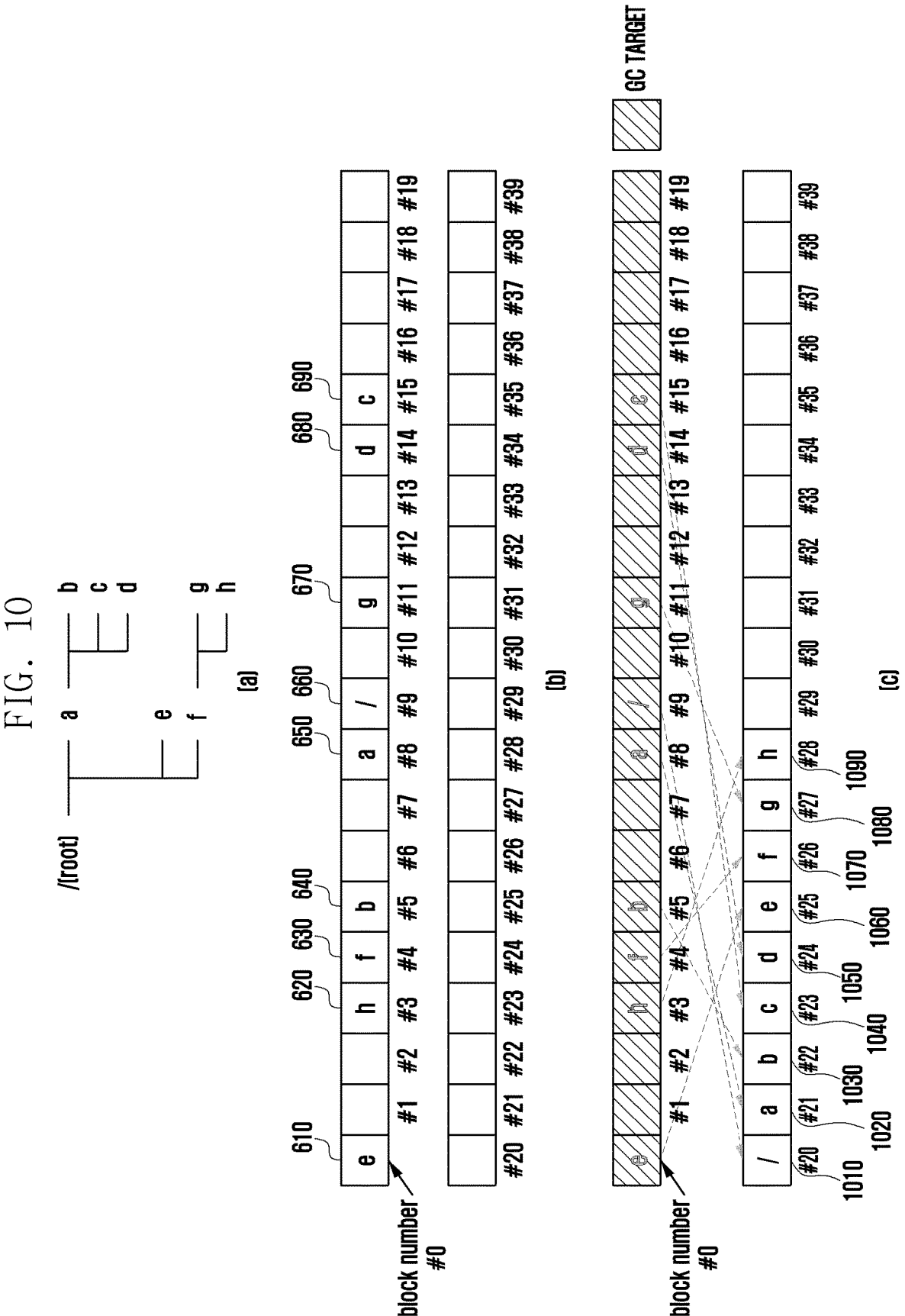
FIG. 10 illustrates a GC according to FIG. 9.

FIG. 9 is a flowchart of garbage collection according to one or more embodiments, and FIG. 10 illustrates garbage collection according to FIG. 9.

According to one or more embodiments, allocation/release of the storage device may be performed in a predetermined unit. As allocation and release are repeated in a predetermined unit, a released area may exist in various parts of the storage device. Garbage collection (GC) may refer to an operation of collecting released areas by moving a stored file. In case that a single file is split and stored because there is not enough released space on the storage device, the file system should access multiple areas, resulting in deceleration of processing speed.

According to one or more embodiments, the log-structured file system may perform garbage collection. The log-structured file system needs to secure an empty space due to its structural characteristics. In the log-structured file system, garbage collection may be performed when a storage device has an empty area smaller than a predetermined area and the system of the electronic device is in an idle state. The log-structured file system may determine a node to move and the location of the node by considering the method for searching for nodes in a consistency check of the file system.

Referring to FIG. 9, the log-structured file system may select a garbage collection area in operation 910 to perform garbage collection. According to one or more embodiments, (a) and (b) of FIG. 10 may be the same as (a) and (b) of FIG. 6 for better understanding. Here, the description of (a) and (b) of FIG. 10 may be the same as the description of (a) and (b) of FIG. 6, and thus may be omitted. According to one or more embodiments, the log-structured file system may select blocks #0 to #19 as the garbage collection area in (b) of FIG. 10.

According to one or more embodiments, the log-structured file system may analyze a directory cache in operation 920. The log-structured file system may determine the directory structure by analyzing the directory cache. The log-structured file system may determine the directory structure as shown in FIG. 10A.

According to one or more embodiments, the log-structured file system may select an area to which a node moves in operation 930. The log-structured file system may reconfigure the location of a node to be suitable for a depth-first search. The log-structured file system may select blocks #0 to #19 as nodes to be moved in (b) of FIG. 10 based on the garbage collection area selected in operation 920.

According to one or more embodiments, the log-structured file system may move a node in operation 940. The log-structured file system may store nodes, having been stored in the garbage collection areas #0 to #19, in areas #20 to #39 that are not configured as the garbage collection area. The log-structured file system may store nodes, having been stored in the garbage collection areas #0 to #19, in areas #20 to #39 that are not configured as the garbage collection area in consideration of depth-first search. Based on the depth-first search method, the log-structured file system may allocate a node of the top-level directory (/) in block #20 1010, allocate a node of file a in block #21 1020, allocate a node of file b in block #22 1030, allocate a node of file c in block #23 1040, allocate a node of file d in block #24 1050, allocate a node of file e in block #25 1060, allocate a node of file f in block #26 1070, allocate a node of file g in block #27 1080, and allocate a node of file h in block #28 1090. The log-structured file system may sequentially allocate nodes to areas #20 to #39 that are not configured as garbage collection areas based on the depth-first search method.

Figure 11:
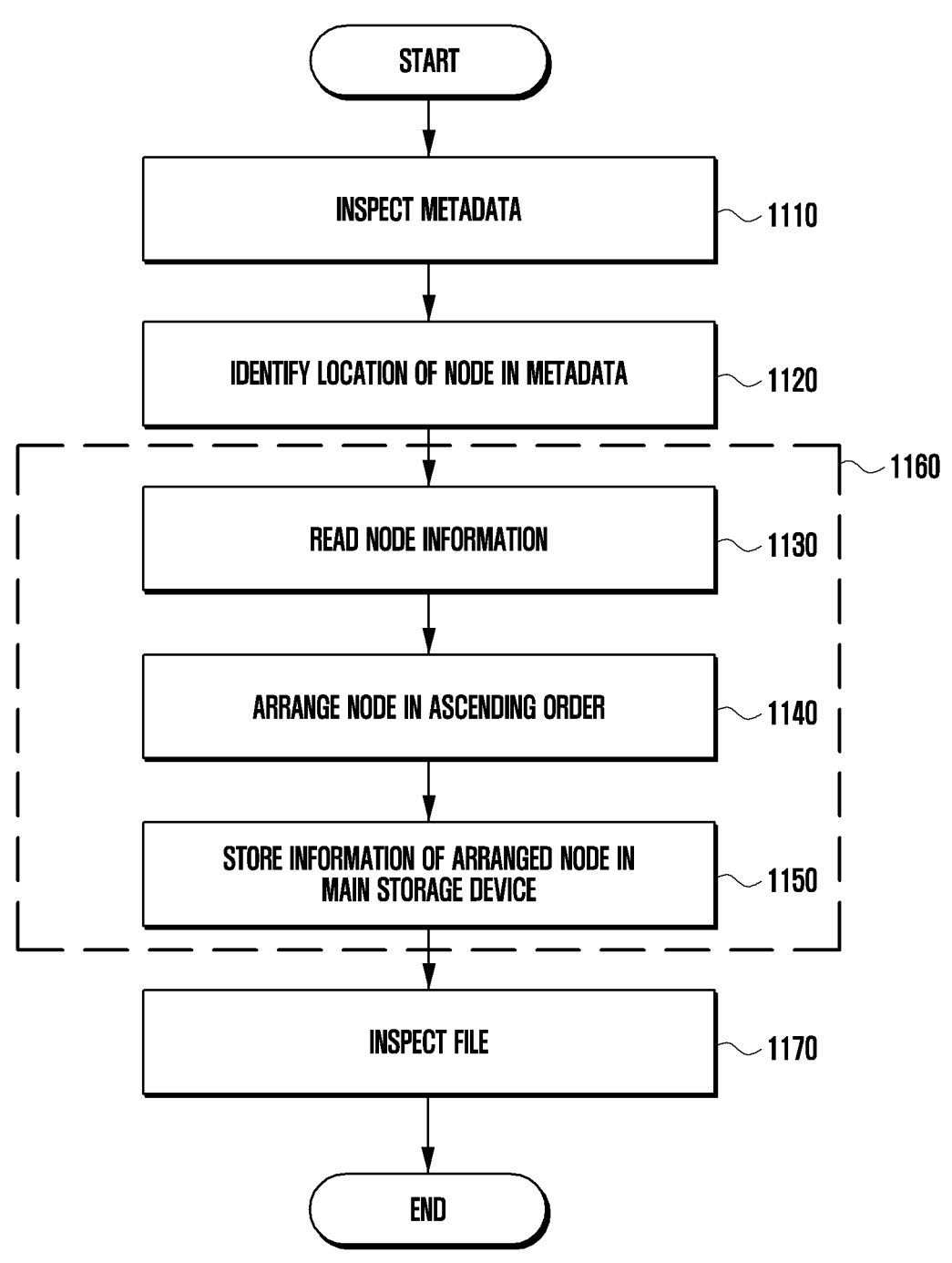
FIG. 11 illustrates a consistency check of a file system according to one or more embodiments.

FIG. 11 illustrates an example of a flowchart of a consistency check of a file system according to one or more embodiments.

According to one or more embodiments, an electronic device (e.g., the electronic device 101 of FIG. 1) may include a main storage device (e.g., the volatile memory 132 of FIG. 1) and an auxiliary storage device (e.g., the non-volatile memory 134 of FIG. 1). A processor of the electronic device (e.g., the processor 120 of FIG. 1) may read data from the auxiliary memory device 134, store the data in the main storage device 132, and process the data. The auxiliary storage device 134 has a low processing speed but is nonvolatile, and may correspond to a hard disk drive (HDD), a solid state drive (SSD), an embedded multimedia card (eMMC), and a universal flash storage (UFS). The main storage device 132 has a high processing speed but is volatile, and may correspond to random access memory (RAM). A method for reading data from the auxiliary storage device 134 includes a random read in which a random area is read and a sequential read in which consecutive areas are sequentially read. Sequential read may operate faster than random read. In case that the area of data to be read is far away, the random read speed may be slower.

According to one or more embodiments, the file system consistency check may inspect metadata in operation 1110. The file system consistency check may inspect errors by reading an area, in which metadata is stored, from the auxiliary storage device (e.g., the nonvolatile memory 134 of FIG. 1). The file system consistency check may store the read metadata in the main storage device (e.g., the volatile memory 132 of FIG. 1) for later use. Operation 1110 may be the same as or similar to operation 510 of FIG. 5.

According to one or more embodiments, the file system consistency check may identify the location of a node in the metadata in operation 1120.

According to one or more embodiments, the file system consistency check may configure a node cache in operation 1160. Operation 1160 may include operations 1130 to 1150.

According to one or more embodiments, the file system consistency check may read node information in operation 1130.

According to one or more embodiments, in operation 1140, the file system consistency check may arrange the node locations based on the node information read in operation 1130. According to an embodiment, the file system consistency check may arrange blocks in which nodes are stored in ascending order in operation 1140. According to another embodiment, in operation 1140, the node locations may be arranged in descending order. For example, the file system consistency check may arrange the blocks in which the nodes are stored in descending order. In the case of arranging the node locations in descending order in operation 1140, parts described as ascending order in the following operations may be replaced by and described as descending order.

According to one or more embodiments, the file system consistency check may read node information in operation 1140. The file system consistency check may read the information of nodes arranged in ascending order.

According to one or more embodiments, the file system consistency check may store the information of the arranged nodes in the main storage device 132 in operation 1150. The file system consistency check may configure a node cache in the main storage device 132. For example, the file system consistency check may store the node information in the main storage device 132.

According to one or more embodiments, the file system consistency check may inspect a file in operation 1170. The file system consistency check may inspect an error of a file starting from the top-level directory based on the depth-first search method. The file system consistency check may inspect an error of a file through multitasking. The file system consistency check may randomly divide a file to be inspected and generate multiple threads to inspect an error of the file. The number of threads to be generated may not be limited. In addition, criteria for generating a thread may be applied in various manners. For example, a thread may be generated based on the structure of a directory. As another example, a thread may be generated based on the number of files to be processed by one thread. When errors are detected, the file system consistency check may correct and/or recover errors.

An electronic device (e.g., the electronic device 101 of FIG. 1) according to one or more embodiments of the disclosure may include an auxiliary storage device (e.g., the nonvolatile memory 143 of FIG. 1) configured to manage files stored in a log-structured file system, a main storage device (e.g., the volatile memory 132 of FIG. 1), and a processor (e.g., the processor 120 of FIG. 1) operatively connected to the auxiliary storage device and the main storage device, wherein the processor 120 is configured to inspect metadata of the auxiliary storage device 134, identify a location of a node of the file in the metadata, read information of the node in the identified location of the node of the file, arrange the node based on the information of the node, store the information of the arranged node in the main storage device 132, and inspect the node information stored in the main storage device 132.

In the auxiliary storage device 134 of the electronic device according to one or more embodiments of the disclosure, a first area in which the node of the file is stored and a second area in which data of the file is stored may be distinguished from each other.

In the electronic device according to one or more embodiments of the disclosure, the processor 120 may be further configured to configure a node cache in the main storage device 132 and store the information of the arranged node in the node cache.

In the electronic device according to one or more embodiments of the disclosure, the processor 120 may be further configured to configure a plurality of threads to divisionally perform an inspection of the node based on the plurality of the threads.

In the electronic device according to one or more embodiments of the disclosure, the processor 120 may be further configured to perform an inspection of the node based on a depth-first search method.

The electronic device 101 according to one or more embodiments of the disclosure may include an auxiliary storage device 134 configured to manage files stored in a log-structured file system, and a processor 120 operatively connected to the auxiliary storage device, wherein the processor is configured to select a garbage collection area in the auxiliary storage device 134, determine the structure of the directory stored in the auxiliary storage device 134, select a garbage collection area in the auxiliary storage device 134, and move a node included in the garbage collection area to an area not selected as the garbage collection area.

In the electronic device according to one or more embodiments of the disclosure, the processor 120 may be configured to select the area (to which the node moves) based on a depth-first search and the determined directory structure.

In the electronic device according to one or more embodiments of the disclosure, the processor 120 may be configured to further determine whether the auxiliary storage device 134 includes an empty area smaller than a predetermined area and whether the electronic device is in an idle state.

In the auxiliary storage device 134 of the electronic device according to one or more embodiments of the disclosure, a first area in which the node of the file is stored and a second area in which data of the file is stored may be distinguished from each other.

In the electronic device according to one or more embodiments of the disclosure, the processor 120 may be configured to move a node by reconfiguring the location of the node to be suitable for a depth-first search.

A method for inspecting the consistency of a log-structured file system in an electronic device according to one or more embodiments of the disclosure may include inspecting metadata of the auxiliary storage device 134, identifying a location of a node of the file in the metadata, reading information of the node based on the location of which is identified, arranging the node based on the information of the node, storing information of the arranged node in a main storage device, and inspecting the node information stored in the main storage device 132.

In the method for inspecting the consistency of a log-structured file system in an electronic device according to one or more embodiments of the disclosure, in the auxiliary storage device, a first area in which the node of the file is stored and a second area in which data of the file is stored may be distinguished from each other.

In the method for inspecting the consistency of a log-structured file system in an electronic device according to one or more embodiments of the disclosure, the storing of the information of the arranged node in a main storage device may include configuring a node cache in the main storage device 132.

In the method for inspecting the consistency of a log-structured file system in an electronic device according to one or more embodiments of the disclosure, the inspecting of information of the node stored in the main storage device 132 may include configuring a plurality of threads to divisionally perform an inspection of the node based on the plurality of the threads.

In the method for inspecting the consistency of a log-structured file system in an electronic device according to one or more embodiments of the disclosure, the inspecting of information of the node stored in the main storage device 132 may correspond to an operation of performing inspection of the node based on a depth-first search method.

A method for performing garbage collection in a log-structured file system in an electronic device according to one or more embodiments of the disclosure may include selecting a garbage collection area in the auxiliary storage device 134, determining the structure of a directory stored in the auxiliary storage device 134, selecting a garbage collection area in the auxiliary storage device 134, and moving a node included in the garbage collection area to an area not selected as the garbage collection area.

In the method for performing garbage collection of an electronic device according to one or more embodiments of the disclosure, the selecting of an area to which the node moves in the auxiliary storage device 134 may correspond to an operation of selecting an area to which the node moves based on a depth-first search and the determined directory structure.

The method for performing garbage collection in an electronic device according to one or more embodiments of the disclosure may further include determining whether the auxiliary storage device 134 includes an empty area smaller than a predetermined area and whether the electronic device is in an idle state.

According to the method for performing garbage collection in an electronic device according to one or more embodiments of the disclosure, in the auxiliary storage device 134, a first area in which the node of the file is stored and a second area in which data of the file is stored may be distinguished from each other.

In the method for performing garbage collection in an electronic device according to one or more embodiments of the disclosure, the moving of the node included in the selected node area may correspond to an operation of moving a node by reconfiguring the location of the node to be suitable for a depth-first search.

The electronic device according to one or more embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that one or more embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

One or more embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each element (e.g., a module or a program) of the above-described elements may include a single entity or multiple entities, and some of the multiple entities may be separately disposed in any other element. According to one or more embodiments, one or more of the above-described elements may be omitted, or one or more other elements may be added. Alternatively or additionally, a plurality of elements (e.g., modules or programs) may be integrated into a single element. In such a case, according to one or more embodiments, the integrated element may still perform one or more functions of each of the plurality of elements in the same or similar manner as they are performed by a corresponding one of the plurality of elements before the integration. According to one or more embodiments, operations performed by the module, the program, or another element may be carried out sequentially, in parallel, repeatedly, or heuristically, or one or more of the operations may be executed in a different order or omitted, or one or more other operations may be added.

What is claimed is:

1. An electronic device comprising:
an auxiliary storage device configured to manage a file stored in a log-structured file system;
a main storage device; and
a processor operatively connected to the auxiliary storage device and the main storage device;
wherein the processor is configured to:
inspect metadata of the auxiliary storage device;
identify locations of nodes of the file in the metadata;
read information corresponding to the nodes positioned at the identified locations;
arrange, based on the read information, the nodes in one of an ascending order or a descending order of a designated number of blocks where each of the nodes is stored at;
store the information of the arranged nodes in the main storage device; and
inspect the stored information of the arranged nodes in the main storage device.

2. The electronic device of claim 1, wherein, in the auxiliary storage device, an area in which the nodes are stored and an area in which data of the file is stored are distinguished from each other.

3. The electronic device of claim 1, wherein the processor is configured to configure a node cache in the main storage device and store the information of the arranged nodes in the node cache.

4. The electronic device of claim 1, wherein the processor is configured to configure a plurality of threads to divisionally perform inspection of the nodes according to the threads.

5. The electronic device of claim 1, wherein the processor is configured to perform inspection of the nodes based on a depth-first search method.

6. A method for inspecting the consistency of a log-structured file system in an electronic device, the method comprising:
inspecting metadata of an auxiliary storage device;
identifying locations of nodes of a file in the metadata;
reading information corresponding to the nodes positioned at the identified locations;
arranging, based on the read information, the nodes in one of an ascending order or a descending order of a designated number of blocks where each of the nodes is stored at;
storing information of the arranged nodes in a main storage device; and
inspecting the nodes information stored in the main storage device.

7. The method for claim 6, wherein, in the auxiliary storage device, an area in which the nodes of the file is stored and an area in which data of the file is stored are distinguished from each other.

8. The method for claim 6, wherein the storing of the information of the arranged nodes in the main storage device comprises configuring a node cache in the main storage device.

9. The method for claim 6, wherein the inspecting of the node information stored in the main storage device comprises configuring a plurality of threads to divisionally perform inspection of the nodes according to the threads.

10. The method for claim 6, wherein the inspecting of the node information stored in the main storage device comprises performing inspection of the nodes based on a depth-first search method.

* * * * *